Feb. 6, 1940.   C. CONRAD   2,189,577
EPISCOPE
Filed April 8, 1938
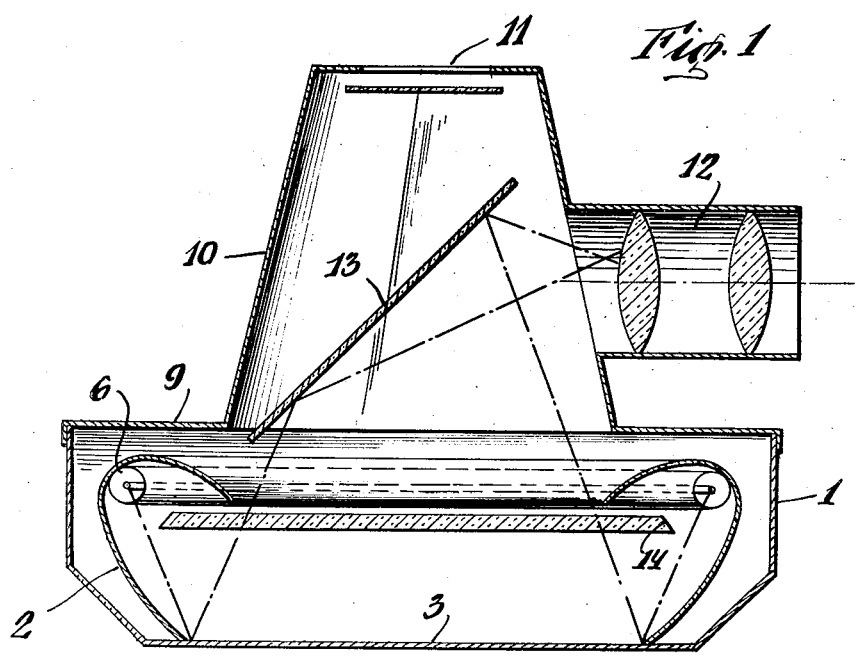
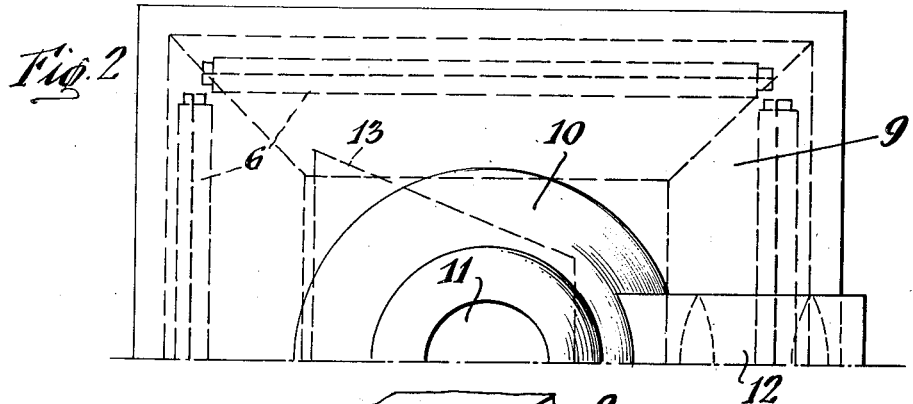
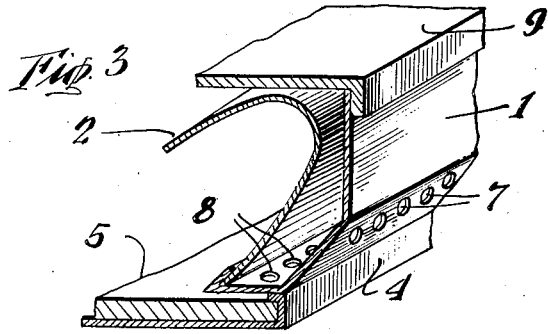
INVENTOR
Carl Conrad
BY
ATTORNEY Patented Feb. 6, 1940

2,189,577

UNITED STATES PATENT OFFICE 2,189,577

EPISCOPE

Carl Conrad, Chur, Switzerland

Application April 8, 1938, Serial No. 200,925

2 Claims. (Cl. 88—24)

This invention has for its object an episcope the illuminating device of which consists of lamps arranged to form a frame, and located within a reflector.

The known apparatus of this character for projecting opaque pictures and other flat objects have the disadvantage of using one part only of the light rays of the source of light for the illumination of the picture field so that a sufficiently strong source of light had to be used in order to produce a satisfactory clearness or brightness upon the projected surface.

It has been attempted to overcome this disadvantage by interposing between the picture field and the objective a reflector composed of plane mirrors having the shape of a truncated cone and by simultaneously arranging the source of light on the outside of this reflector. The rays of this source of light were then directed either directly or indirectly into the interior of the reflector through an opening in one of the plane mirrors by means of an angularly shaped mirror. This construction however, had the disadvantage that a considerable part of the light rays was directed by the mirrors towards the objective instead of towards the object to be illuminated, so that indeed a sufficient brightness on the projected surface was produced but not a sufficient illumination of the object to be projected.

These disadvantages are avoided by my invention, the novelty of which resides in the fact that the reflector in cross-section has the form of a parabola one curve of which confines the picture surface to be projected, while the other curve defines the bunch of rays emanating from the picture surface. By this arrangement I produce not only the full exploitation of the total quantity of the light rays from the source of light, but I also direct the light rays in such a manner that all parts of the picture surface are uniformly illuminated.

Another object of my invention is the arrangement of a reflecting shutter between the picture surface and the lamps for deflecting such direct light beams which cause the production of disturbing reflexes during the projection of reflecting objects, whereby the shutter recasts the light rays thrown against the same to the reflector for producing a change in their directions.

The light intensity in special cases may be increased by the provision of two or more light sources arranged to form a frame with the reflectors appertaining thereto in superposition and in planes parallel to one another.

As is well known, a large part of the energy conducted to the source of light is transformed into heat, all parts of the apparatus are exposed to a considerable increase in temperature, and my novel apparatus therefore has its casing provided with a plurality of openings so that a decisive cooling of the outer face of the reflector as well as of the picture surface by means of atmospheric air is possible.

These and other objects and advantages of my invention will become more fully known as the description thereof proceeds and will then be more specifically defined in the appended claims.

In the accompanying drawing forming a material part of this disclosure the episcope constructed according to my invention is diagrammatically shown as an example, and Fig. 1 is a longitudinal section through the apparatus.

Fig. 2 is a top plan view of one half of the apparatus.

Fig. 3 is a perspective view of part of the casing, of the reflector, and the picture surface.

As illustrated, the lower part of the casing designated 1, can be made of sheet metal or other suitable material and surrounds a frame-like reflector 2 having a parabolic cross-section. One of the curves of this reflector entering a bend in the casing 1 confines the picture surface 3. The second curve of the reflector confines the bunch of rays of the picture field which is reflected towards a mirror as will be described hereafter. A frame 4 (Fig. 3) is arranged at the bottom of the casing 1 in which a readily removable glass plate 5 is slidably held which confined the picture field 3 at the bottom and serves to press easily bendable objects as paper pictures or the like, flat, so that during the projection clear and sharp pictures are produced. Within the reflector 2 tubular lamps 6, preferably such with straight filaments are so arranged that these filaments are located in the focus of the reflector. By this means a proper directing of the light rays is effected and a uniform illumination of the picture surface, and furthermore, a perfect utilization or exploitation of the source of light.

As part of the energy conducted to the filaments is transformed into heat as is well known in the arts, the reflector, as well as the casing and the picture surface are subjected to heat for a considerable degree, and in order to overcome this drawback and to reduce the temperature to an endurable degree, the wall of the casing 1 is provided with openings 7 and the parts engaging the reflector have openings 8. The former allow the entrance of fresh air into the space between reflector and casing, part of which rises to cool the outer face of the reflector 2 while another part passes over the picture face.

Other such openings may be provided within the upper part 9 of the apparatus so that other fresh air drafts can pass over the apex of the reflector, and these openings are so arranged that no light rays can pass to the outside.

The upper part 9 of the apparatus has the form of a truncated cone 10 with an opening 11 for the exhaust of the hot air however protected against discharge of light rays. This upper part can be made from sheet metal, Bakelite, or any other suitable material. In order to further the air circulation within the apparatus, the upper part of the casing may carry a ventilator or the like or the same may also be mounted within the casing.

The upper part 9 carries the objective 12 and a mirror 13 behind this objective, and the mirror reflects the bunch of rays coming from the picture field onto the objective 12.

It has also been discovered, that the use of glass plates for covering the articles to be projected or with the use of highly glittering pictures for the projection, certain direct light rays will produce disturbing reflexes upon the projection surface. By the arrangement of a reflecting shuter 14 between the source of light and the picture surface such rays are re-directed upon the reflector 2, and the arrangement of such a shutter will not cause any reduction in the exploitation of the full force of the light as practical experiments have proven.

It will be understood that I have described and shown the preferred form of my invention only as an example of the many possible ways to practically construct the same, and that I may make such changes in the general arrangement of the apparatus and in the construction of its minor details as come within the scope of the appended claims without departure from the spirit of my invention and the principles involved.

Having thus described my invention, what I claim as new and desire to secure by Letters Patent is:

1. In an episcope as described, a base having its lower portion formed as a casing, and its upper portion having the form of a truncated cone having an upper air exhaust opening, an objective carrier formed with said cone laterally disposed thereto, a reflector in said casing substantially parabolic in cross-section with one of its curves entering a bend in said casing, a picture field, a plurality of tubular incandescent lamps arranged to form a frame within said reflector with their filaments located in the focus of the reflector, an inclined mirror in the conical portion of said device, to receive the image from the picture field confined by the other curve of said reflector, and an objective laterally disposed to said mirror in its carrier to project the picture onto a screen, a glass plate combined with said casing for covering objects to be projected, to hold the articles to be projected flat and to act as a reflecting shutter, and means for providing an air cooling system for the episcope.

2. In an episcope as described, a frame like reflector having a parabolic cross-section with one of its curves entering a bend in said casing, and confining the picture field at the top, a frame at the bottom of said casing and a removable glass-plate slidably held in said frame, confining the picture field at the bottom of said casing and flattening bendable objects to be projected, tubular lamps having straight filaments so arranged within the said reflector as to have their filaments located in the focus of the reflector for ensuring a proper direction of the light rays and a uniform illumination of the picture surface, the wall of said casing provided with a plurality of openings to allow the entrance of fresh air into the space between reflector and casing for cooling reflector and picture surface, an objective, and a mirror in the upper part of said casing behind said objective at such an inclination as to reflect the bunch of rays coming from the picture field into the objective.

CARL CONRAD.